United States Patent [19]

Rutten et al.

[11] Patent Number: 4,810,570
[45] Date of Patent: Mar. 7, 1989

[54] POLYOLEFIN FOAMS HAVING OPEN AND/OR CLOSED PORES AND CONSISTING OF POLYOLEFINS OF ULTRAHIGH MOLECULAR WEIGHT, PROCESS FOR THEIR PRODUCTION, AND THEIR USE

[75] Inventors: Hendrikus J. J. Rutten, Maastricht; Pieter B. Pluyter, Sittard, both of Netherlands

[73] Assignee: Stamicarbon B.V., Geleen, Netherlands

[21] Appl. No.: 223,660

[22] Filed: Jul. 25, 1988

[30] Foreign Application Priority Data

Jul. 23, 1987 [DE] Fed. Rep. of Germany ....... 3724435

[51] Int. Cl.$^4$ .......................... B29D 9/00; B32B 3/26; B32B 5/20; C08F 110/00
[52] U.S. Cl. ................. 428/318.6; 264/45.5; 264/53; 264/54; 428/318.8; 428/319.7; 521/51; 521/143
[58] Field of Search .......................... 264/45.5, 53, 54; 428/304.4, 318.6, 318.8, 319.7; 521/51, 143

[56] References Cited

U.S. PATENT DOCUMENTS 4,033,929  7/1977  Stiles et al. .................. 428/318.6
4,655,769  4/1987  Zachariades .................. 521/143
4,692,269  9/1987  Kmiec et al. .................. 521/143

Primary Examiner—William J. Van Balen
Attorney, Agent, or Firm—Cushman, Darby & Cushman

[57] ABSTRACT

The invention relates to polyolefin foams consisting of polyolefins of ultrahigh molecular weight, i.e. weight-average molecular weight from about $4 \times 10^5$ to $6 \times 10^6$ g/mol and higher, and to a novel process for producing these foams by foaming a solution of a polyolefin of ultrahigh molecular weight in a solvent with the use of a physical or chemical blowing agent or of an inert gas blown into the solution, and cooling of the resulting foam to a temperature below the gelling temperature of the polyolefin. If appropriate, these foams can be provided wholly or partially with a smooth skin on their surface by superficial cooling, if appropriate under the action of pressure. These foams are distinguished by high tensile strength and impact strength values, shock-absorbing properties, low glass transition temperatures, low embrittlement at low temperatures and high chemical resistance, and they are used especially as mechanical and acoustic insulating materials, materials of construction, filter agents and implantation materials.

13 Claims, No Drawings

POLYOLEFIN FOAMS HAVING OPEN AND/OR CLOSED PORES AND CONSISTING OF POLYOLEFINS OF ULTRAHIGH MOLECULAR WEIGHT, PROCESS FOR THEIR PRODUCTION, AND THEIR USE

The invention relates to polyolefin foams having open and/or closed pores and consisting of polyolefins of ultrahigh molecular weight, especially of polyethylenes of ultrahigh molecular weight, i.e. of a weight-average molecular weight from about $4\times 10^5$ to $6\times 10^6$ g/mol (weight-average molecular weight) and higher, to a novel process for producing such foams and to their use, especially as mechanical and acoustic insulating materials, as materials of construction, as medical implantation materials, for the manufacture of parts of garments, and the like.

The production of foams from polyethylenes of low to medium molecular weights, i.e. weight-average molecular weights, which are markedly below $4\times 10^5$ g/mol, by foaming polyethylene melts with the use of physical or chemical foaming methods is known.

It has not been possible hitherto, however, to produce foams from polyolefins of ultrahigh molecular weights, i.e. molecular weights of more than $4\times 10^5$ g/mol by foaming a polyolefin melt, since the high viscosity of melts of polyolefins of ultrahigh molecular weights no longer permits foaming.

There is, however, a demand for foams of polyolefins of ultrahigh molecular weight, since such foams are more rigid, tougher and more resistant to abrasion than foams of polyolefins of low to medium molecular weights.

It is therefore the object of the invention to provide polyolefin foams having open and/or closed pores and consisting of polyolefins of ultrahigh molecular weights.

Thus, the object of the invention is to provide polyolefin foams consisting of polyolefins of ultrahigh molecular weight.

This object is achieved by the polyolefin foams according to the invention, consisting of polyolefins of ultrahigh molecular weights, i.e. molecular weights between about $4\times 10^5$ and $6\times 10^6$ g/mol and higher.

These polyolefin foams according to the invention are distinguished from the hitherto known foams of polyethylenes of low to medium molecular weights by higher rigidities, toughnesses, impact strengths and tensile strengths and a uniform pore structure and they can therefore be used as materials of construction, for example for the manufacture of the internal layers of skis, aircraft wing elements and as mechanical and acoustic insulating material, as shock absorbing materials, and in applications under cryogenic conditions like in space and laboratory testing equipment, where they have the advantage of a lower weight and more favourable Young modulus/density ratio as compared with the polyurethanes frequently employed for such purposes. Other advantages of a polyolefine such as polyethylene compared with polyurethanes are, low glass transition temperatures, low embrittlement at low temperatures and high chemical resistance.

Preferably, the polyolefin foams according to the invention are provided wholly or partially with a skin, depending on the intended application.

They consist, in particular, of polyethylenes, but other polyolefins, such a polypropylenes, can also be used.

The density of the polyolefin foams according to the invention is preferably between 0.01 and 0.8 g/cm$^3$.

The process for producing the polyolefin foams according to the invention comprises foaming a solution of a polyolefin of ultrahigh molecular weight in a solvent and cooling the resulting foams to a temperature below the gelling temperature of the polyolefin. This novel process of foaming from a solution thus makes it possible for the first time to produce polyolefin foams from polyolefins of ultrahigh molecular weight, since such polyolefins can no longer be foamed from the melt, due to the high viscosity of the melt.

For certain applications, it can be advantageous to provide the foams wholly or partially with a skin, which skin can be produced by superficially cooling th resulting polyolefin foam, which appropriately is still at an elevated temperature, if appropriate under the action of pressure, for example by means of cooled roller.

Preferably, the foam is generated by physical or chemical blowing agents or, according to another embodiment of the invention, the foam can also be generated by removing the polyolefin solvent especially by evaporation or freeze-drying.

To enhance the mechanical properties of the foams according to the invention, it can be advantaqeous to crosslink the foam while it is being cooled to a temperature below the gelling temperature or subsequently thereto.

The polyolefins of ultrahigh molecular weight, from which the foams according to the invention are produced, are preferably polyethylenes which can contain considerable quantities of one or more other alkenes copolymerizable therewith, such as propylene, butylene, pentene, hexene, 4-methylpentene, octene and the like. However, they can also consist of other polyolefins, such as propylene homopolymers and copolymers, and the polyolefins used can also contain considerable quantities of one or more other polymers, especially 1-alkene polymers.

For carrying out the foaming, these polyolefin starting materials are dissolved in a solvent. The solvents used can be the halogenated and non-halogenated hydrocarbons known for polyolefins of ultrahigh molecular weights, especially aliphatic, cycloaliphatic and aromatic hydrocarbons having boiling points of at least 80° C., such as paraffins, toluene, xylenes, tetralin, decalin, $C_9$–$C_{12}$-alkanes and petroleum fractions. It is also possible to use solvents which are solid at room temperature but liquid at the dissolution temperature such as paraffin waxes. Preferably, the dissolution is effected at a temperature between 160° and 200° C., decalin being used as a particularly preferred solvent. The dissolution temperature depends on the particular polyolefin employed, the solent used, the quantity to be dissolved and the equipment used for dissolution. In an advantageous manner the dissolution is effected in an extruder, especially in a twin-screw extruder, which is fed by a suspension of the polyolefin to be dissolved in the particular solvent, one or more static mixers preferably being also provided downstream of the extruder. The residence time in the extruder is advantageously between 1 and 25 minutes and especially between 3 and 15 minutes. The polyolefin goes into solution, assisted by the kneading effect in the extruder and in the static mixers which may be provided down-stream.

Known additives, such as fillers, stabilizers against degradation by ultraviolet radiation or ozone, crosslinking agents, pigments, lubricants such as calcium stearate, flameproofing agents, crystallization agents, pore size control agents, antistatic agents and the like can be added to the starting suspension for preparing the solution.

The blowing agents used to effect foaming can be the known physical blowing agents, such as highly volatile compounds which are liquid at room temperature or at elevated temperatures and the boiling points of which are below 110° C., especially aliphatic hydrocarbons, chlorohydrocarbons and fluorohydrocarbons, and also the known chemical blowing agents such as carbonates and bicarbonates, nitrites, hydrides, peroxides, oxalic acid derivatives, urea and related compounds, azo compounds, hydrazine derivatives, semicarbazides, azides, N-nitroso compounds or triazoles. A review of the blowing agents which can be used is to be found in "Kunststoffe", volume 62, 1972, pages 687 to 689.

The usual compounds, for example zinc oxide and zinc stearate, can be used as blowing agent activators.

Foaming can be carried out already in the extruder, using a physical or chemical blowing agent, in which case the solution must of course be maintained at a temperature sufficiently high to volatilize the physical blowing agents to an adequate extent or to decompose the chemical blowing agents with evolution of gas. If desired, the generation of foam in the extruder can also be effected by introducing gases such as air, nitrogen and the like.

If foaming takes place already in the extruder, the foam generated can be formed by shaping dies from the extruder to give any desired shapes such as tapes, bars, pipes and the like, whereupon the foam is cooled to a temperature below the gelling temperature of the polyolefin employed, for example by blowing with cooled gases such as air, introducing into cooling baths such as water baths which can, for example, have a temperature of about 15° C.

If the foaming is to take place only outside the extruder, the physical or chemical blowing agents used must have such high boiling points or decomposition points that no foaming due to volatilization or gas evolution occurs within the extruder at the dissolution temperatures maintained therein. On leaving the extruder, the solution of the polyolefins must then be heated to a temperature above the boiling point or decomposition point, respectively, of the physical or chemical blowing agents, to effect the foaming.

Foaming with the use of inert gases is also possible outside the extruder. For this purpose, the solution which is to be foamed is appropriately filled into a mold which corresponds to the shape of the polyolefin foam to be produced, whereupon an inert gas is blown in for effecting the foaming.

It is frequently appropriate to provide the polyolefin foams according to the invention wholly or partially with a smooth skin on their surface. This skin can be produced in such a way that the surface of the polyolefin foam which has been generated and is still at an elevated temperature, is cooled, if appropriate under the action of pressure, for example using cooled rollers or metal plates.

Foaming can also be effected in such a way that the solvent employed for dissolving the polyolefin is evaporated, extracted or removed by freeze-drying, foam pores being formed.

If the foam formation is effected by means of physical or chemical blowing agents or with the use of inert gases, the solvent is removed from the foams either by drying, especially by leaving it to evaporate at room temperature, or by extraction with the use of light liquid solvents, preferably in an inert gas atmosphere, the solvent removal advantageously being carried out after the foam has been cooled to a temperature below the gelling temperature of the particular polyolefin.

Independently of the foaming method applied, foaming of the solution advantageously takes place with the use of a solution which contains at least 20% by weight of a solvent, and it is possible to influence the pore size and pore structure by varying the viscosity of the solution which is to be foamed.

After the foams have been cooled to a temperature below the gelling temperature of the particular polyolefin, the foams can be crosslinked in the known manner for modifying the physical properties, for example chemically by peroxide crosslinking or physically by electron beam irradiation.

For stiffening the polyolefin foams, entanglement of the polymer molecules can preferably be carried out in such a way that the foams, if they are solvent-free, are heated to a temperature between 10° C. below the crystalline melting point and below the decomposition temperature of the polyolefins or, if they still contain solvent, are heated to a temperature above the dissolution temperature and below the decomposition temperature.

The examples which follow illustrate the invention.

EXAMPLE 1

A suspension of 9% by weight of polyethylene having a weight-average molecular weight of about $1.5 \times 10^6$ g/mol (Hostalen GUR 412 ®) and 0.45% by weight, relative to the solvent, of Genitron OB ® as a foaming agent in decalin is fed to a twin-screw extruder and subjected therein to a temperature of 180° C. for dissolving the polyethylene and for foaming the solution obtained. The residence time in the extruder is 7 minutes. The foam generated emerges downwards from a vertically positioned die of 250 mm width and 3 mm height at a speed of 15 cm/minute and is introduced into a cooling bath consisting of water at a temperature of 15° C. in order to gel the polyethylene. A piece of dimensions $20 \times 11 \times 50$ mm is cut out of the strip obtained. The solvent is allowed to evaporate from this piece in a Freon ® atmosphere. This piece of polyethylene foam has a density of 0.4 g/cm$^3$ and a tensile strength of 9.5 MPa and an elongation at break of 500%.

EXAMPLE 2

The procedure followed is as described in Example 1, with the exception that the shaping die, from which the foamed polyethylene strip emerges, is arranged horizontally and, after leaving the die, the surface of the strip is contacted by a cooling roller maintained at a temperature of 20° C. in order to produce a smooth skin. The density of the foam obtained in this way is 0.5 g/cm$^3$.

EXAMPLE 3

A suspension of 20% by weight polyethylene having a weight average molecular weight of about $1.5 \times 10^6$ g/mol (Hostalen GUR 412 ®) in decalin is fed to a twin screw extruder and subjected therein to a temperature of 180° C. for dissolving the polyethylene. The residence time in the extruder is 8 minutes. The solution is subsequently cooled to below the gelling temperature of the polyethylene. The foam is generated by extracting the solvent with acetone.

The density of the foam is 0.4 g/cm$^3$. The foam has a Young's modulus of 72 MPa, a tensile strength of 4.2 MPa and an elongation at break of 80% at room temperature.

The properties of the foam at $-25°$ C. are the following: a Young's modulus of 120 MPa, a tensile strength of 4.2 MPa and an elongation at break of 20%.

We claim:

1. A polyolefin foam having open and/or closed pores and consisting of a polyolefin of ultrahigh molecular weight of more than 400,000 g/mol (weight-average molecular weight).

2. A polyolefin foam as claimed in claim 1, which is provided wholly or partially with a skin.

3. A polyolefin foam as claimed in claim 1, which consists of polyethylene.

4. A polyolefin foam as claimed in claim 3, which has a density from 0.01 to 0.8 g/cm$^3$.

5. A process for producing a polyolefin foam as claimed in claim 1, which comprises foaming a solution of polyolefin of ultrahigh molecular weight in a solvent and cooling the resulting foam to a temperature below the gelling temperature of the polyolefin.

6. A process as claimed in claim 5, wherein the polyolefin foam is provided wholly or partially with a skin.

7. A process as claimed in claim 6, wherein the skin is produced by superficially cooling the polyolefin foam, if appropriate under the action of pressure.

8. A process as claimed in claim 5, wherein the foam is generated by physical or chemical blowing agents.

9. A process as claimed in claim 5, wherein the foam is generated by removal of the polyolefin solvent.

10. A process as claimed in claim 9, wherein the foam is generated by evaporation of the solvent or freeze-drying.

11. A process as claimed in claim 5, wherein the polyolefin foam is crosslinked while it is being cooled to a temperature below the gelling temperature or subsequently thereto.

12. A process as claimed in claim 5, wherein, for entangling the polymer molecules, the foam, if it no longer contains any solvent, is heated to a temperature between 10° C. below the crystallization temperature and below the decomposition temperature of the polyolefin or, if the foam still contains solvent, it is heated to a temperature above the dissolution temperature and below the decomposition temperature of the polyolefin.

13. A mechanical or acoustic insulating material, a material of construction, a filter agent or an implantation material made from the foam according to claim 1.

* * * * *